Figure 1:
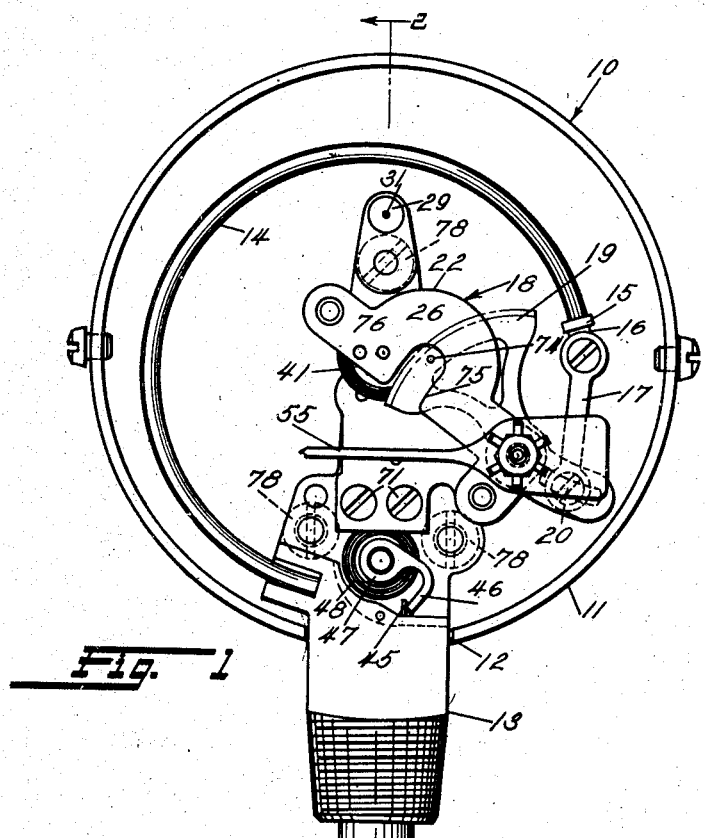

Oct. 17, 1939.　　　M. KLEIN ET AL　　　2,176,263
GAUGE
Filed May 22, 1936　　　2 Sheets-Sheet 1

Inventor
Maximilian Klein
Reidar A. Tollefsen

By Strauch & Hoffman
Attorneys

Oct. 17, 1939.   M. KLEIN ET AL   2,176,263
GAUGE
Filed May 22, 1936   2 Sheets-Sheet 2

Inventor
Maximilian Klein
Reidar A. Tollefsen
By Strauch & Hoffman
Attorneys

Patented Oct. 17, 1939

2,176,263

UNITED STATES PATENT OFFICE 2,176,263

GAUGE

Maximilian Klein and Reidar A. Tollefsen, Sellersville, Pa., assignors to United States Gauge Company, Sellersville, Pa., a corporation of Pennsylvania Application May 22, 1936, Serial No. 81,330

8 Claims. (Cl. 116—129)

The present invention relates to novel telltale indicator means designed for use as an adjunct to pressure gauges, thermometers, vacuum gauges and other like indicators. More specifically, the present invention relates to the provision of a concealed tell-tale indicator sealed or locked against unauthorized inspection and tampering and accessible only to an authorized person in order to determine whether the system upon which the gauge is mounted has at any time been operated at excessive or inadequate pressures, temperatures or the like, and the amount of such excesses or inadequacies.

In order to clearly understand the present improvement, it will be described in connection with a house heating system which constitutes a preferred use of the novel indicator. In present day sales of heating systems, it is common practice for the vendor to guarantee the system against defects in material. To protect himself against unjust claims, the vendor specifies the maximum pressure to which the system is to be subjected. In many cases replacements, in accordance with the guarantee, have been made, when as a matter of fact, the injury resulted from the improper operation of the system and not from defects in material. Such replacements have been necessitated because of the vendor's inability to show the improper use of the system. This inability to prove the improper use of the system has not been eliminated by the provision of existing tell-tale indicators since they are visible to the operator of the system and are readily accessible to unprincipled operators who may set them back within the permissible pressure range and thus defeat the purpose of the tell-tale indicator.

It is, therefore, a major object of the present invention to provide a pressure gauge, vacuum gauge, thermometer or the like with an adjunct designed to indicate excessive or inadequate pressures, temperatures, etc., which is not visible to the operator and is sealed by a means the removal of which will be immediately apparent to the vendor's authorized inspector.

Another object of the present invention resides in providing a pressure gauge or the like with a tell-tale pointer that is mounted on the framework of the conventional gauge movement to form a unitary assembly designed for bodily insertion in the casing behind the dial plate.

A further object of the present invention consists in providing a conventional dial plate with a graduated scale on its rear face designed to cooperate with the tell-tale pointer carried by the indicator movement, in order that the maximum indications of the variables attained in the system upon which the indicator is used may be conveniently ascertained by the authorized inspector upon breaking the seal and removing the protecting casing.

Still another object of the present invention resides in providing an instrument, designed to indicate the instantaneous values of a variable by means of a pointer having a magnified movement, with means for operating a maximum indicator by an element of the instantaneous indicator movement designed for normal movement.

A further object of the present invention resides in providing the segment gear of a conventional Bourdon tube indicating instrument with an upstanding pin designed to move in the path of a tell-tale pointer to cause said tell-tale pointer to move over an auxiliary scale and indicate the maximum reading of the instrument.

Another object of the present invention resides in providing an indicator of the dial and pointer type with a concealed scale and pointer designed to indicate the maximum reading of the indicator.

A further object of the present invention resides in providing an indicator of the dial and pointer type provided with a maximum indicator with novel means designed to retain the maximum indicator under yielding frictional pressure in its indicating position while permitting relatively unimpeded movement by the actuating mechanism.

Still another object of the present invention resides in providing a pressure gauge with a tell-tale indicator pointer mounted concentrically with the arbor of the gear segment of a conventional dial and pointer indicator to effect a simple operating connection while maintaining the tell-tale indicator in concealment within the protecting instrument casing.

Another object of the present invention resides in providing a novel combined pivotal connection and arbor bearing for the tell-tale pointer and segment arbor.

Figure 2:
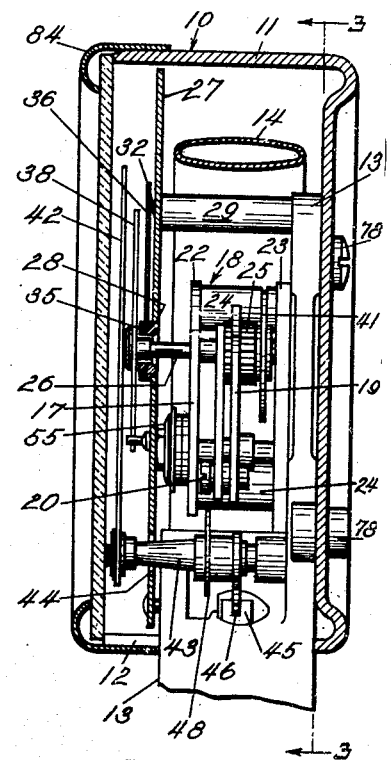
Figures 4, 5:
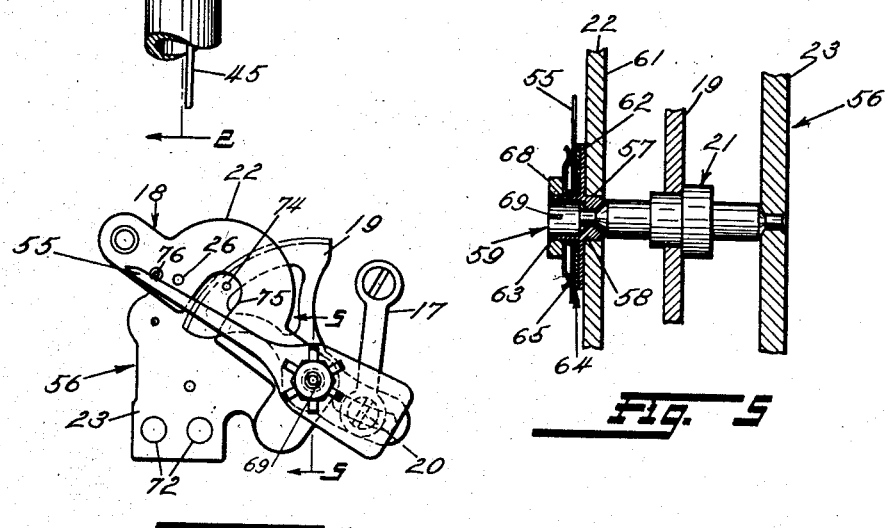
Figure 3:
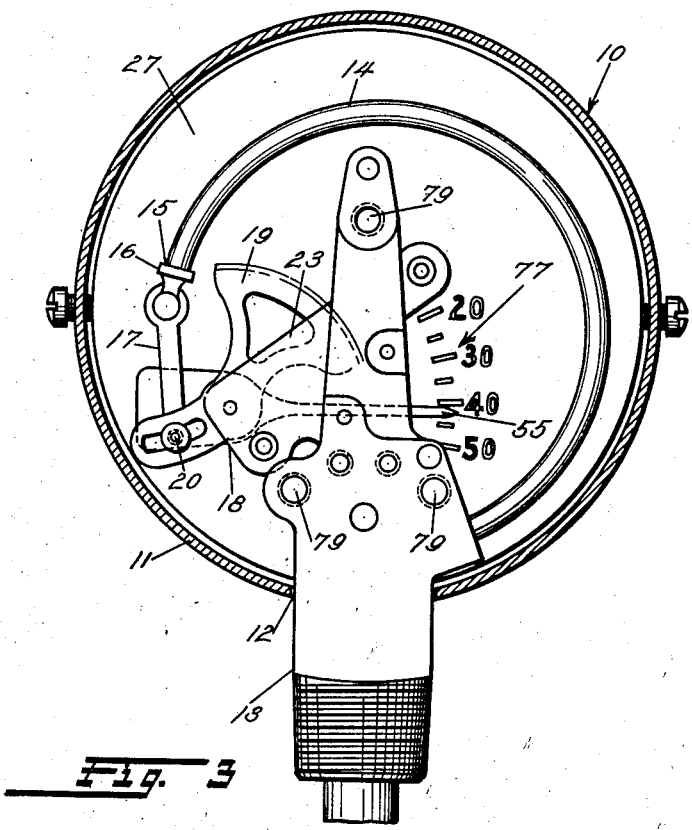
Figure 7:
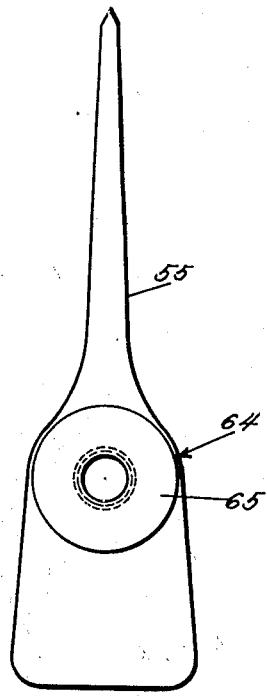
Figure 6:
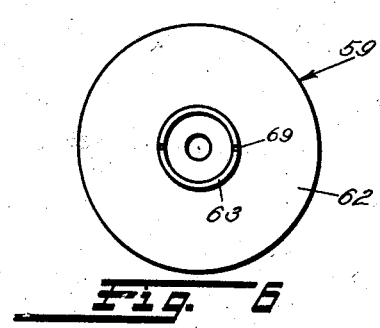
Figure 8:
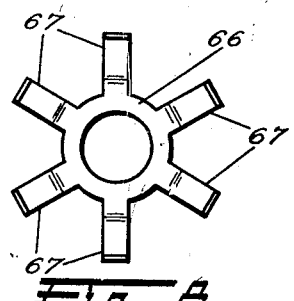
Figure 9:
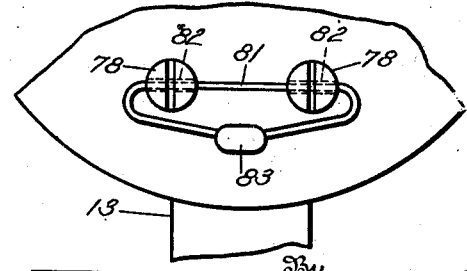

Other objects will appear from the detailed description when studied in connection with the appended claims and attached drawings wherein:

Figure 1 is a front view of a dial and pointer indicator with certain of the parts removed to show more clearly the present invention, Figure 2 is a vertical sectional view taken on line 2—2 of Figure 1 looking in the direction of the arrows and showing the instrument of Figure 1 with the omitted parts in place, Figure 3 is a sectional view taken on line 3—3 of Figure 2 looking in the direction of the arrows and showing the relation of the tell-tale scale and pointer of the present invention to the conventional indicator structure, Figure 4 is a detail view disclosing the unitary assembly of the instrument movement and the tell-tale pointer of the present invention as embodied in the instrument illustrated in Figure 1, Figure 5 is a sectional view taken on line 5—5 of Figure 4 showing the novel arbor bearing and tell-tale pointer mounting of the present invention, Figure 6 is a detailed view of the bushing which forms the bearing for the arbor and the pivot for the tell-tale pointer, Figure 7 is a detailed view of the bushing which carries the tell-tale pointer and pivotally cooperates with the bushing of Figure 6, Figure 8 is a detailed view of the spring washer which yieldingly maintains the bushings of Figures 6 and 7 in contact to prevent accidental rotation of the tell-tale pointer and, Figure 9 is a fragmental elevational view of the sealing means used to prevent unauthorized access to the auxiliary scale and tell-tale pointer.

With continued reference to the drawings wherein like reference numerals are used to indicate the same parts throughout the several figures, the numeral 10 indicates a combined temperature and pressure gauge of the Bourdon tube type embodying the novel improvement of the present invention. Gauge 10 includes a casing 11 having a slot 12 therein designed to receive a hollow mounting post 13 of conventional design. A Bourdon tube 14 is connected to post 13 in any well-known manner and its free end 15 is provided with a connector 16 designed for operative connection to a link 17 forming a part of a conventional gauge movement 18.

Movement 18 includes a gear segment 19 connected at 20 with the free end of link 17 and mounted for rotation with an arbor 21 which is supported in suitable bearings in front and rear frame plates 22 and 23, respectively. Suitable bolt assemblies 24 to retain plates 22 and 23 in assembled relation. A pinion gear 25 designed for cooperative engagement with segment 19 is carried by an arbor 26 supported in suitable bearing apertures formed in plates 22 and 23 respectively. A dial plate 27 having a central aperture 28 is secured to posts 29 extending from mounting post 13. To this end posts 29 are provided with suitably drilled apertures 31 which are designed to receive securing pins 32.

Aperture 28 is provided with a hollow bushing 35 which carries a pointer 36. Pointer 36 is adapted to be manually set to indicate the maximum pressure within which the system containing the gauge 10 is designed to operate. One end of shaft 26 is designed to project through bushing 35 and is provided with an indicator pointer 38 which is designed to rotate over dial plate 27 in well known manner. Pinion 25 and gear segment 19 cause rotation of pointer 38 in accordance with movement of Bourdon tube 14 as the pressure within tube 14 varies. Due to the provision of pinion 25 and segment 19 the movement of pointer 38 will be greatly magnified and as a consequence the usual scale provided on the face of dial 27 may be divided into readily discernible divisions. A suitable hair spring 41 is provided for insuring smooth, regular, rotation of shaft 26 and pointer 38 and for aiding in returning pointer 38 toward its zero position when the pressure in tube 14 is reduced.

As heretofore pointed out gauge 10 is a combination temperature and pressure instrument, therefore, a pointer 42 is provided and designed for clockwise movement to indicate changes of temperature on a scale on dial plate 27. Pointer 42 is rotatably carried on an arbor 43 which is supported on mounting post 13 and extends through an aperture 44 in dial plate 27. A bi-metallic strip 45 extending through hollow post 13 into the pressure medium is provided for actuating pointer 42. Strip 45 contacts an extending arm 46 provided on a hub 47 connected to and rotatable with arbor 43. Strip 45 is designed to flex in a counter-clockwise direction upon an increase in temperature. Due to this movement of strip 45, it will be clear that strip 45 moves away from arm 46 permitting a hair spring 48 to cause clockwise rotation of pointer 42 over dial plate 27. Since strip 45 is at all times in the path of and just ahead of arm 46, it will be clear that rotation of pointer 42 is always under control of strip 45.

The structure so far described, with the exception of pointer 36, forms no part of the present invention and is known in the art. This structure, however, is incapable of performing the desirable function of advising an inspector or other authorized person of the maximum pressure attained in the system upon which the gauge is mounted. The novel structure for accomplishing this function which comprises the present invention will now be described.

A pointer 55 is pivotally mounted on the exposed face of plate 22 and is designed to form a unit 56 along with the frame, gear segment 19 and operating link 17 of gauge movement 18 and be housed within casing 11 behind and concealed by dial plate 27. In order to simplify the construction of the novel telltale indicator provided by the present invention the pivot of pointer 55 is preferably aligned with arbor 21 of segment 19. This is accomplished by providing plate 22 with an enlarged aperture 57 which receives a hub 58 of a bearing bushing 59. Bushing 59 fits snugly in aperture 57 and is spun so that the end of hub 58 lies flush with the rear face 61 of plate 22. Hub 58 is smooth and free of burrs on its exposed end and is suitably reamed after its connection to plate 22 in order to provide the bearing for the forward end of arbor 21. The rear bearing is formed in the usual manner in plate 23.

A transversely extending flange 62 is formed on bushing 59 and is designed to lie flush against the front face of plate 22. Bushing 59 extends forwardly beyond flange 62 to form a portion 63. The outer cylindrical surface of portion 63 and the adjacent surface of flange 62 are carefully machined to provide smooth bearing surfaces. A second bushing 64 having pointer 55 non-rotatably secured thereto is positioned on portion 63. Bushing 64 is provided with a flange 65 similar to flange 62 of bushing 59. The bore of bushing 64 and the surface of flange 65 adjacent flange 62 are machined in the same manner as the above mentioned portions of bushing 59. A spring washer 66 having radially extending, offset, spring legs 67 is positioned on portion 63 of bushing 59 with its legs 67 in engagement with flange 65 of bushing 64. A nut 68 is screw-threadedly secured to suitable threads formed on portion 63 of bushing 59 and is designed to abut washer 66 and force bushing 64 along portion 63 of bushing 59 and retain the machined surfaces of bushings 59 and 64 in frictional contact. It will be apparent that the frictional contact of flanges 62 and 65 may be varied by tightening or loosening nut 68. Nut 68 is locked in its adjusted position by spreading the threaded end of bushing 59 which is split at 69 for this purpose.

From the structure just described, it will be readily apparent that the conventional gauge movement and the adjunct in the form of a rotatable pointer and arbor bearing assembly form unit 56 which is bodily secured to post 13 by screws 71 which pass through apertures 72 in plate 23 and threadedly engage suitably tapped apertures in post 13.

Pointer 55 as seen in Figures 1 and 4 extends toward the left of arbor 21 and overlies the path of movement of gear segment 19. A suitable pin 74 is secured in segment 19 and projects above the upper face of segment 19 into the path of pointer 55. A suitable recess 75 in plate 22 permits unimpeded movement of pin 74. A stop pin 76 is provided on plate 22 for limiting clockwise movement of pointer 55. A suitable scale 77 is formed on the rear of dial plate 27 and is designed to cooperate with pointer 55.

Scale 77 is graduated to indicate a portion only of the pressure indicated by pointer 38 and is preferably designed to indicate only the upper pressures to which the gauge is subjected. This scale, since it is traversed by pointer 55 which rotates at a slower speed than pointer 38, due to the absence of the geared connection, is more compact and the range of pressure per unit of arc is greater. The purpose of this novel construction of scale 77 is to permit the greatest possible pressure range to be indicated in the small available sight space in the rear of the dial plate 27.

After unit 56 is secured to post 13 the post with the attached operating elements of gauge 10 secured thereto is inserted and secured in casing 11 by placing post 13 in slot 12 and inserting screws 78 into threaded apertures 79 formed in the rear face of post 13. A sealing wire 81 is inserted through transverse holes 82 in screws 78 and the free ends are secured by a seal 83. This sealing structure locks the gauge parts within casing 11 and prevents unauthorized access to tell-tale pointer 55. A conventional bezel and crystal assembly 84 placed over the open side of casing 11 completes gauge 10.

Gauge 10 operates as follows: as the pressure increases Bourdon tube 14 flexes and through link 17 rotates gear segment 19 in a counterclockwise direction. Pinion 25 as a consequence is rotated in a clockwise direction carrying pointer 38 over the scale on dial plate 27 thereby indicating the instantaneous value of the pressure. Due to the aforementioned gear reduction effected by segment 19 and pinion 25 the movement of pointer 38 is materially magnified and very slight pressure variations are readily readable from the conventional scale on dial plate 27. So long as the pressure remains within the limits indicated by hand 36 no movement of pointer 55 will take place since pointer 55 is initially set to indicate the pressure at which pointer 36 is set. This action will be apparent from an inspection of Figure 4 wherein pointer 55 is shown in its normal position as set at the time gauge 10 is connected in the system. Actuating pin 74, due to the setting of pointer 55, is disposed so that it does not contact pointer 55 until the maximum pressure indicated by pointer 36 is reached.

When the predetermined pressure is reached pin 74 is designed to just contact pointer 55. A further increase in pressure will move pointer 55 to its indicating position against the frictional resistance of washer 66. Due to the carefully machined fit provided between bushings 59 and 64, movement of pointer 55 will not affect the normal operation of the gauge movement 18. Upon cessation of the pressure, segment 19 will move in a clockwise direction under the influence of Bourbon tube 14 and hair spring 41 and pin 74 will move out of contact with pointer 55 leaving pointer 55 at its maximum indicating position. The frictional resistance imparted to bushings 59 and 64 by washer 66 will maintain pointer 55 against accidental movement and thereby maintain the pointer in its indicating position until an authorized person resets it or when the pressure exceeds the predetermined maximum.

From the above description, it will be apparent that the present invention provides a simple, rugged and accurate maximum pressure indicator that is concealed from the view of unauthorized persons and sealed against tampering. By the provision of this novel structure applicant has provided an efficient tell-tale device that permits manufacturers of pressure and like systems to accurately determine whether or not their systems have been abused and to indicate the extent of such abuse. With the gauge of the present invention installed in a heating system or the like, unprincipled users of pressure and temperature systems cannot make unjust claims against guarantees of the manufacturers of such systems.

While the present invention has been described as a tell-tale for indicating the maximum pressure, it will be apparent that it may be used to indicate maximum temperatures or maximum vacuum values by slight alterations in the manner in which it is assembled with respect to the operating parts of the different indicating instruments.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In an indicator, the combination of a casing having a window therein, responsive means in said casing subject to instantaneous changes in a variable, means including, a dial plate bearing a graduated scale disposed in said casing and exposed to view through said window, a pointer cooperating with said scale for indicating instantaneous values of said variable, mechanism operatively connecting said responsive means and said pointer, said second mentioned means also bearing a second graduated scale hidden from view by said casing and said dial plate, a second pointer cooperating with said last mentioned scale for indicating predetermined values of said variable, mounting means for said second pointer, said second pointer and its mounting means being disposed entirely behind said dial plate, and means on said mechanism for actuating said second pointer only when the variable reaches said predetermined values whereby only authorized persons may determine whether said predetermined values have been reached.

2. The combination defined in claim 1 wherein said second graduated scale is formed on the rear face of said dial plate.

3. In an indicating instrument embodying a pressure responsive element, the combination of a gear segment designed for operation by said element, an arbor designed to carry said gear segment, a framework supporting said arbor, a bushing carried by said framework in concentric relation to said arbor, a journal bearing formed in said bushing and designed to form a bearing for one end of said arbor, a hub formed on said bushing and an indicator pointer rotatably supported on said hub.

4. The combination defined in claim 3 wherein said gear segment is provided with a pin designed to contact and move said pointer throughout a predetermined pressure range.

5. A mounting for an indicator pointer comprising a stationary bushing, a pointer hand, a second bushing rotatably mounted on said first mentioned bushing and designed to carry said hand, said bushings having superposed transversely extending contacting flanges the engaging surfaces of which are machined to permit rotation of said hand without objectional retardation and means for yieldingly binding said bushings in non-rotatable relation whereby inadvertent movement of said hand is prevented.

6. A combined spindle bearing and mounting for an indicator pointer comprising a stationary bushing having a transversely disposed outwardly extending flange and a bearing formation adjacent one end, a spindle supported by said bearing formation, a pointer hand, a second bushing rotatably mounted on said first mentioned bushing and designed to carry said hand and means freely mounted on said first mentioned bushing designed to yieldingly force said second bushing against said flange to bind said bushings in non-rotatable relation whereby inadvertent movement of said hand is prevented, said means comprising a spring washer and a nut designed to vary the binding force of said washer whereby the retarding engagement of said bushings may be adjusted.

7. A mounting for an indicator pointer comprising a pair of relatively rotatable bushings, a hand secured to and rotatable with one of said bushings, spring means mounted on one of said bushings and designed to engage said other bushing and force it into contact with a portion of said one bushing to prevent inadvertent relative rotation, a nut designed to vary the binding force of said spring means and means on one of said bushings designed to lock said nut and prevent inadvertent loosening of said nut and consequent variation of said binding force.

8. An indicator responsive to a variable such as pressure, temperature or the like, attained in the operation of heating or analogous systems, comprising a casing having an open face, means in said casing responsive to the instantaneous value of said variable, means including, a dial plate closing the open face of said casing and having a graduated scale on its exposed face, a pointer cooperating with said scale to indicate the instantaneous value of said variable, mechanism interconnecting said responsive means and said pointer for operating said pointer, said second mentioned means also bearing a second scale housed by said casing and disposed behind said dial plate to conceal it from view from the outside of said indicator, a second pointer cooperating with said last mentioned scale and designed to indicate values of said variable beyond the normal range specified for the particular system, mounting means for said second pointer, said second pointer and its mounting means being disposed entirely behind said dial plate, and means forming a part of said mechanism for operating said last mentioned pointer only when the normal range of the system is exceeded whereby only authorized persons may determine whether the system has been improperly operated.

MAXIMILIAN KLEIN.
REIDAR A. TOLLEFSEN.